US007047111B2

(12) United States Patent
Schliep et al.

(10) Patent No.: US 7,047,111 B2
(45) Date of Patent: May 16, 2006

(54) METHOD AND SYSTEM FOR CONTROLLING AND/OR REGULATION A LOAD OF A VEHICLE

(75) Inventors: Michael Schliep, Aichtal (DE); Szabolcs Toergyekes, Stuttgart (DE); Walter Zipp, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 278 days.

(21) Appl. No.: 10/450,645

(22) PCT Filed: Nov. 23, 2001

(86) PCT No.: PCT/EP01/13655

§ 371 (c)(1),
(2), (4) Date: Nov. 12, 2003

(87) PCT Pub. No.: WO02/48529

PCT Pub. Date: Jun. 20, 2002

(65) Prior Publication Data

US 2004/0073357 A1 Apr. 15, 2004

(30) Foreign Application Priority Data

Dec. 14, 2000 (DE) ................................ 100 62 349

(51) Int. Cl.
*G05D 1/00* (2006.01)

(52) U.S. Cl. .............................. 701/2; 701/36; 701/70; 701/101; 381/71.1

(58) Field of Classification Search .................... 701/1, 701/2, 36, 70, 93, 54, 99, 101, 102, 111; 381/71.1–71.9
See application file for complete search history.

(56) References Cited

U.S. PATENT DOCUMENTS

| | | | | |
|---|---|---|---|---|
| 5,638,454 | A * | 6/1997 | Jones et al. | 381/71.14 |
| 5,666,427 | A * | 9/1997 | Kim et al. | 381/71.1 |
| 6,688,422 | B1 * | 2/2004 | Fuesser et al. | 181/206 |
| 6,845,162 | B1 * | 1/2005 | Emborg et al. | 381/71.4 |

FOREIGN PATENT DOCUMENTS

| | | |
|---|---|---|
| DE | 4407475 | 9/1995 |
| EP | 0545027 | 6/1993 |
| EP | 0806560 | 11/1997 |
| JP | 04238749 | 8/1992 |
| JP | 2000306200 | 11/2000 |

* cited by examiner

*Primary Examiner*—Richard M. Camby
(74) *Attorney, Agent, or Firm*—Crowell & Moring LLP

(57) ABSTRACT

In order to improve a noise emission or noise emission which is caused by a vehicle, according to the invention the instantaneous load (L) of the vehicle (F) is determined with a method for controlling and/or regulating a load (L) of a vehicle (F) by means of a pickup unit (6, 6A to 6C) with reference to at least one operating variable (B) of the vehicle (F), the operating variable (B) being controlled and/or regulated by means of a control unit or regulator unit (2) as a function of a noise level (G(G), G(F), G(U)) resulting from the instantaneous load (L) of the vehicle (F).

17 Claims, 4 Drawing Sheets

METHOD AND SYSTEM FOR CONTROLLING AND/OR REGULATION A LOAD OF A VEHICLE

BACKGROUND AND SUMMARY OF THE INVENTION

This application claims the priority of 100 62349.2 filed Dec. 14, 2000 and PCT/EP01/13655, filed Nov. 23, 2001, the disclosure of which is expressly incorporated by reference herein.

The invention relates to a method and to an arrangement for controlling and/or regulating a load of a vehicle, for example of a passenger car or utility vehicle.

Such methods and arrangements are generally known. By way of example, reference is made in this regard to German Reference DE 44 07 475 A1. Here, both the load and the fuel/air ratio are influenced on the basis of a setpoint value for the torque which is to be output by the drive unit. In particular, a fine, very precise adjustment of the engine torque is provided, which improves the traveling comfort. In addition to such requirements which improve the traveling comfort or the emission of exhaust gases, further factors such as safety, environmental protection and the saving of energy are significant nowadays. This includes also protecting the population against noise pollution. As the volume of traffic increases and population density becomes higher, the requirements in terms of reducing damaging environmental effects due to traffic noise are becoming more stringent. In order to protect the population against traffic noise and to ensure compliance with immission limiting values in accordance with the traffic noise protection ordinance 16. BImSchV, public roads are usually diverted around populated areas or appropriate velocity limits are imposed on roads, or driving bans are even declared.

JP 04238749 A describes a method for minimizing the noise level of an engine, which method uses the current velocity of the vehicle and the current position of the gas pedal to control the rotational speed transmission ratio and the throttle valve position of the engine.

The object of the invention is therefore to specify a method and an arrangement for controlling and/or regulating a load of a vehicle in which the noise emission or noise emission caused by the vehicle is improved.

The present invention involves a method for controlling and/or regulating a load of a vehicle which acts as an accelerating or decelerating torque, the instantaneous loading of the vehicle being determined by means of at least one operating variable of the vehicle by means of a pickup unit, and the operating variable being controlled and/or regulated by means of a control unit or regulator unit as a function of a noise level resulting from the instantaneous loading of the vehicle. By taking into account in this way the operating and/or ambient noises of the traveling vehicle, caused in particular by the load of the vehicle itself and the process of regulating it, the noise emissions and imissions which are caused by the traveling process can be considerably reduced. Moreover, the control/regulation of the load which correlates to the noise level permits the traveling comfort to be increased. In addition, depending on the degree to which noise is reduced or the radiation of noise is limited by means of the method, it also becomes possible to travel on roads and in downtown areas and regions in which driving has been banned for noise reasons.

The noise-related operating variable regulation and/or control which reduces the load-related and vehicle-related noise emission/imission is adapted to the functions for setting the vehicle drive. It is essential here that a setpoint torque for controlling/regulating the vehicle as a function of the noise level and information on the dynamics with which this torque request is to be set are predefined by means of the control unit or regulator unit (also referred to as torque interface, referred to below as control unit) by reference to the instantaneous loading. Here, which subsystems (control or regulation systems, for example rotational speed regulator) are involved in the torque interface and the way in which they are coordinated with one another are completely irrelevant. The preferred use of noise-related characteristic curve diagrams for various regulating and/or control variables which represent the operating variable and in which the requirements are predefined with different dynamics and with different objectives makes it possible to allow for the different subsystems.

The invention is also based on the idea that, in order to comply with noise limiting values, for example in residential areas or in the vicinity of hospitals, the vehicle should be limited in terms of its noise emission. The operating variable on which the noise level is based is expediently used as the operating variable which is to be controlled or regulated. As a result, both the ambient noises and the operating noises of the vehicle which are caused by the instantaneously output power are taken into account in the control or regulation of the power. The factors which are relevant for the generation of the noise in terms of the operating variable to be regulated or controlled are taken into account by this regulating and/or controlling process and appropriately influenced. For example, the selection of the transmission ratio of a shiftable or infinitely variable transmission is a noise-related factor.

A rotational speed, a torque, a velocity and/or an acceleration are advantageously used as the operating variable. Here, the change in the rotational speed is used to change the torque profile with the objective of achieving a higher engine power at a low rotational speed, as a result of which the noise emission is kept particularly low. In other words, when the vehicle is at full load and at a low rotational speed, less noise is generated by the vehicle. Alternatively, or in addition, a transmission speed and/or a transmission ratio in an infinitely variable force transmission arrangement are used as operating variable. Advantageously, the acceleration is monitored and used as the most important operating variable influencing the generation of noise. The variable which is to be controlled/regulated and which is to bring about the desired acceleration of the vehicle is the instantaneously called load of the engine. If the calling of the load which is to be brought about by the desired acceleration would result in a generation of noise which lies above a specific limiting value, the control unit reduces the load which is actually called to the extent that the limiting value is not exceeded.

In a preferred embodiment, in order to determine the respective setpoint value of the operating variable, various characteristic diagrams in which the dependence of the noise level on the instantaneous velocity, rotational speed, load and/or the selected gear velocity is mapped are stored. A desired acceleration can be achieved, for example in a low gear velocity given a low load and a high rotational speed, and at the same time give rise to a different noise level (higher or lower) than another characteristic diagram point which implements the same acceleration by means of a high load with a lower rotational speed in the higher gear velocity. The setpoint torque which is processed with other setpoint torques, for example from the transmission controller, from a vehicle movement dynamics regulator or other subsystems of the drive control (for example from a digital map) is determined by reference to the characteristic curve diagrams.

The noise level is advantageously determined by reference to the instantaneous loading of the vehicle and/or by reference to ambient noises. For this purpose, various measuring curves are sensed for the noise level as a function of the type of vehicle, age of vehicle, type of engine of the vehicle, velocity of the vehicle, design of the vehicle, acceleration of the vehicle on different road coverings and/or tire parameters and/or meteorological events (for example wind, rain) and are stored in the form of characteristic curve diagrams by reference to which the noise level representing the instantaneous loading of the vehicle is then determined. Alternatively, or in addition, ambient noises and/or operating noises are sensed and processed by means of the pickup unit, for example by means of a microphone. As a result, the sound emission resulting from the interaction between tire and underlying surface or body of the vehicle and wind can be detected and can thus be taken into account in the noise-reducing control/regulation of the load. The pickup unit can be embodied here as a fixed and/or mobile noise-sensing unit. Moreover, such fixed and/or mobile noise-sensing units can be used to take into account ambient noises which cannot be influenced during the control/regulating process (for example the maximum value can be corrected upward in the case of rain).

The noise level is expediently monitored for compliance with a limiting value or with a guide value. For example, the maximum permissible noise level for various regions, for example residential area, commercial area, is different. The compliance with these predefined limiting values for the maximum permissible noise level is taken into account in a supplementary way in the control/regulation of the operating variable. The locality-related limiting values are stored, for example, in the form of a table in a database.

In order to permit the noise of the traveling vehicle to be reduced in a locality-related fashion, the operating variable is preferably controlled and/or regulated as a function of the instantaneous position of the vehicle. Here, corresponding limiting values are taken into account for the noise level for various geographic coordinates in the control/regulation of the operating variable. As a result, for example, greater reduction of noise than the customary noise reduction level is made possible in zones where noise is critical. For this purpose, the pickup unit preferably comprises a location determining system and/or a geographic information system. Depending on the type and design of the pickup unit, the location determining system and/or the geographic information system may be integrated or be connected to the pickup unit in a decentralized fashion via an interface.

Alternatively, or in addition, the operating variable is advantageously controlled and/or regulated as a function of time. As a result, a necessary reduction in noise which is adapted to times of day and night is made possible and resulting setpoint values can be predefined for the respective operating variable. Alternatively, or in addition, the operating variable can be predefined manually, for example by the driver of the vehicle or another occupant of the vehicle.

The present invention also involves an arrangement for controlling and/or regulating a load of a vehicle with a pickup unit for determining the instantaneously called load of the vehicle by reference to at least one operating variable of the vehicle, and a control unit for controlling and/or regulating the operating variable as a function of a noise level resulting from the instantaneous loading of the vehicle.

In order to take into account external noises which cannot be influenced and/or are related to the vehicle, the pickup unit expediently comprises a noise sensing system for determining the ambient noises. For example, fixed and/or mobile noise sensing systems, for example sound sensors, microphones, are used for this. For example, airborne or solid-borne sensors are used for determining the airborne or solid-borne sound. The pickup unit is advantageously provided for sensing a velocity, an acceleration (deceleration) and/or a drive torque in order to determine the instantaneous load on the vehicle. As a result, the noise level which results from the instantaneous loading can be determined by reference to characteristic curve diagrams stored in a data memory, for example.

Alternatively, and/or in addition, a location-determining system is preferably provided for determining the instantaneous position of the vehicle and/or an information system is provided for determining a locality-related noise level which results therefrom. This makes it possible to comply with a maximum permissible noise level at a locality by setting the operating variable by means of a corresponding setpoint value.

Alternatively, and/or in addition, the control unit comprises an input device for manually controlling and/or regulating the operating variable. As a result, it is possible to switch off the noise-related regulation/control of the load in a situation which is critical for traveling safety, for example. It is possible, for example in a critical traffic situation, to avoid an accident as a result of a load which exceeds the noise limiting value being called. The control/regulation of the load can be influenced, if necessary switched off entirely, either manually by an operator, for example the driver, or automatically by means of a superordinate regulating/controlling process.

Furthermore, predefined values of external systems, in particular of a traffic control system, are expediently taken into account in the control and/or regulation of the operating variable by means of the control unit or regulator unit via the pickup unit. The predefined values of external systems relating to the control and/or regulation of the operating variable are preferably approved by the driver of the vehicle and/or by an occupant of the vehicle by means of the control unit or regulator unit. The driving behavior can thus be adapted at any time to the given travel situation.

An output unit, for example a display, is preferably provided for outputting vehicle-related and/or ambient data such as, for example, the instantaneous position of the vehicle, locality-related and time-related noise limiting values, noise guide values and noise threshold values, vehicle-related operating variables and regulating or control states of the control unit or regulator unit. The interventions of the control unit or regulator unit into the vehicle system during the control and/or regulation of the operating variable and vehicle-related operating variables, for example velocity, acceleration, rotational speed, torque, are preferably stored in a data memory for documentation purposes. Statistics, for example noise statistics, can be created from the data stored in the data memory. Alternatively, or in addition, recommendations for maintenance and repair of the vehicle, for example time when the exhaust gas system should be exchanged, can be derived from the data stored in the data memory.

The interventions of the control unit or regulator unit into the vehicle system during the control and/or regulation of the operating variable can advantageously be transferred to an external system, for example traffic control system, for monitoring purposes. The control unit can preferably be activated or deactivated by external systems, for example traffic control systems or toll points, by means of the pickup unit. This makes it possible for the control unit to optimize the traffic flow. Moreover, alternatively, or in addition, further variables, for example consumption, emissions of noxious substances, wear and traveling comfort, are taken into account in the interventions by the control unit in the vehicle system in order to control and/or regulate the operating variables. Depending on the type and design as well as complexity of the control functions and/or regulating functions of the control unit, artificial intelligence methods, for example neural networks and/or fuzzy logic, are used.

The advantages which are achieved with the invention comprise in particular the fact that, in order to reduce the noise pollution by the vehicle in a perceptible and enduring fashion, the influencing variable or operating variable which is relevant to the generation of noise are controlled and/or regulated as a function of the instantaneous noise level. The noise limitation resulting from such power limitation permits local noise limiting values or noise guide values, for example in the region of downtown areas and hospitals, to be complied with. It makes it possible, for example, to limit the rotational speed of a vehicle traveling at full load in such a way that the vehicle does not exceed a respective noise level.

BRIEF DESCRIPTION OF THE DRAWINGS

Exemplary embodiments of the invention are explained in more detail with reference to a drawing, in which.

DETAILED DESCRIPTION OF THE PREFERRED EMBODIMENT

Figure 1:
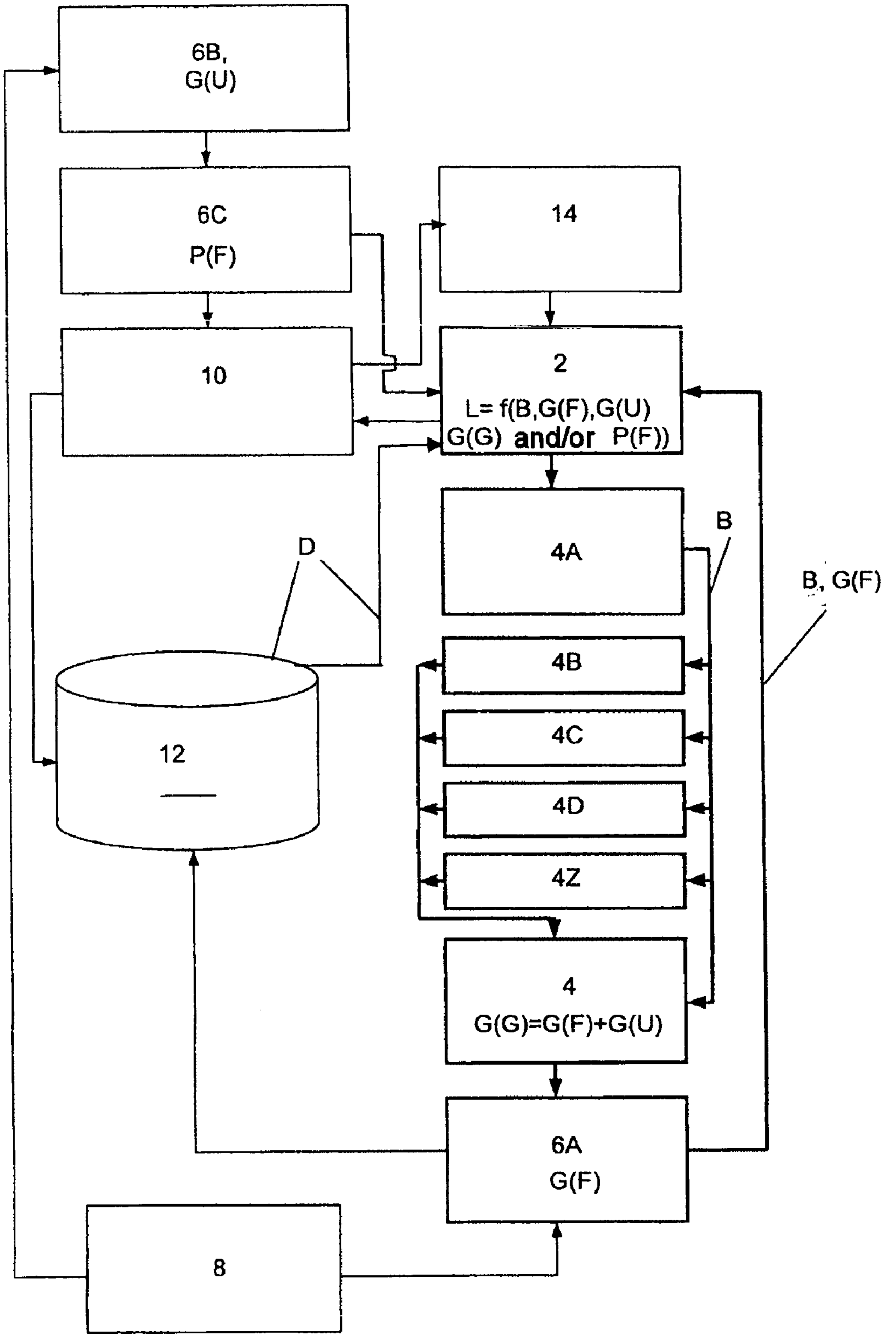
FIG. 1 is a schematic view of an arrangement for controlling and/or regulating a load with a pickup unit and a control unit or regulator unit.

FIG. 1 illustrates an arrangement 1 for controlling and/or regulating a load L of a vehicle. The arrangement 1 comprises a control unit or regulator unit 2 (referred to below as control unit for short) for controlling and/or regulating an operating variable B as a function of a noise level G(F) (=vehicle-related noise level) resulting from the instantaneous load L of the vehicle F. The vehicle-related noise level G(F) results here from vehicle-related sound sources 4A to 4Z, for example an engine 4A, an exhaust gas system 4B, a drive train 4C and tires 4D. Depending on the type and design, further vehicle-related sound sources 4Z which all contribute to the vehicle-related noise emission 4 can be taken into account.

A pickup unit 6A is provided for determining the vehicle-related noise level G(F) and/or the instantaneous load L of the vehicle F by reference to the operating variable B. The vehicle-related pickup unit 6A comprises, for example, sensors for sensing the velocity of the vehicle, the acceleration of the vehicle and/or the drive torque, as well as sound sensors for determining an overall noise level G(G). In order to take into account noise sources 8 which are external and thus not related to the vehicle, a pickup unit 6B for picking up external noises G(U) (=ambient noise level) which cannot be influenced by the vehicle F is also alternatively or additionally provided. Depending on the type and design of the pickup unit 6A and 6B, the pickup unit 6A is embodied in a way which is related to the vehicle, and is thus mobile, whereas the pickup unit 6B is arranged in a locality-related way and thus fixed, for example at the edge of the road. The vehicle-related and the locality-related pickup units 6A and 6B, for example sound sensors, sense the overall noise level G(G) which results from the superimposition of vehicle-related noise level (G(F) and locality-related noise level (G(U) according to: G(G)=G(F,U)=G(F)+G(U). Alternatively or additionally, a further pickup unit 6C is provided for determining the instantaneous position P(F) of the vehicle. An internal and/or external location determining system or information system, for example, is used as the pickup unit 6C. This system can also make available dynamic changing noise limiting values or noise guide values to the control unit 2.

Alternatively or additionally, the operating variable B can thus be controlled and/or regulated by means of the instantaneous position P(F) of the vehicle determined by reference to the pickup unit 6C and/or by means of the instantaneous overall noise level G(G). Furthermore, the arrangement 1 can alternatively or additionally comprise an output unit 10 for displaying the instantaneous regulating and/or control state of the control unit 2 in a visual fashion, for example on a screen or audibly, for example by means of a loudspeaker. The instantaneous position P(F), the ambient/vehicle-related/overall noise level G(U), G(F), G(G) and/or the operating variable B, in particular its setpoint value and/or actual value, as well as the load L can be output by means of the output unit 10, for example.

Depending on the type and design, the arrangement 1 can also comprise a data memory 12. The data memory 12 comprises, for example, vehicle-related data D stored in the form of characteristic curve diagrams, for example characteristic curve diagram for the noise level as a function of the velocity of the vehicle and of the acceleration of the vehicle, noise level as a function of the rotational speed and of the torque or archived data D of operating variables B, for example rotational speed, torque, velocity, acceleration and other vehicle-related data D, for example overall mass, size, design of vehicle, type, engine power, age of vehicle. Furthermore, the data D which is collected by the pickup units 6A to 6C can also be stored in the data memory 12. The data D which is stored in the data memory 12, in particular the characteristic curve diagrams, can alternatively or additionally, depending on the predefined value, be taken into account in the regulation/control of the load by the control unit 2. For example, the noise-related regulation/control of the load in an old vehicle F can have different setting values that in a new vehicle F with a new noise-reduced drive.

Furthermore, an input device 14 by means of which, for example, the driver can switch off the noise-reducing load regulation in the case of a critical driving situation or can switch into a different operating mode is provided for manually controlling and/or regulating the operating variable B and thus the load L. For example, the gas pedal is used as an input device 14 which switches over, when pressed quickly, into what is referred to as the kick down mode which then leads to noise-related load regulation/control being switched over into the load regulation/control mode which is optimized for maximum acceleration of the vehicle. Further input devices may be, for example, manually activated push-button keys or a module with a voice recognition facility.

Figure 2:
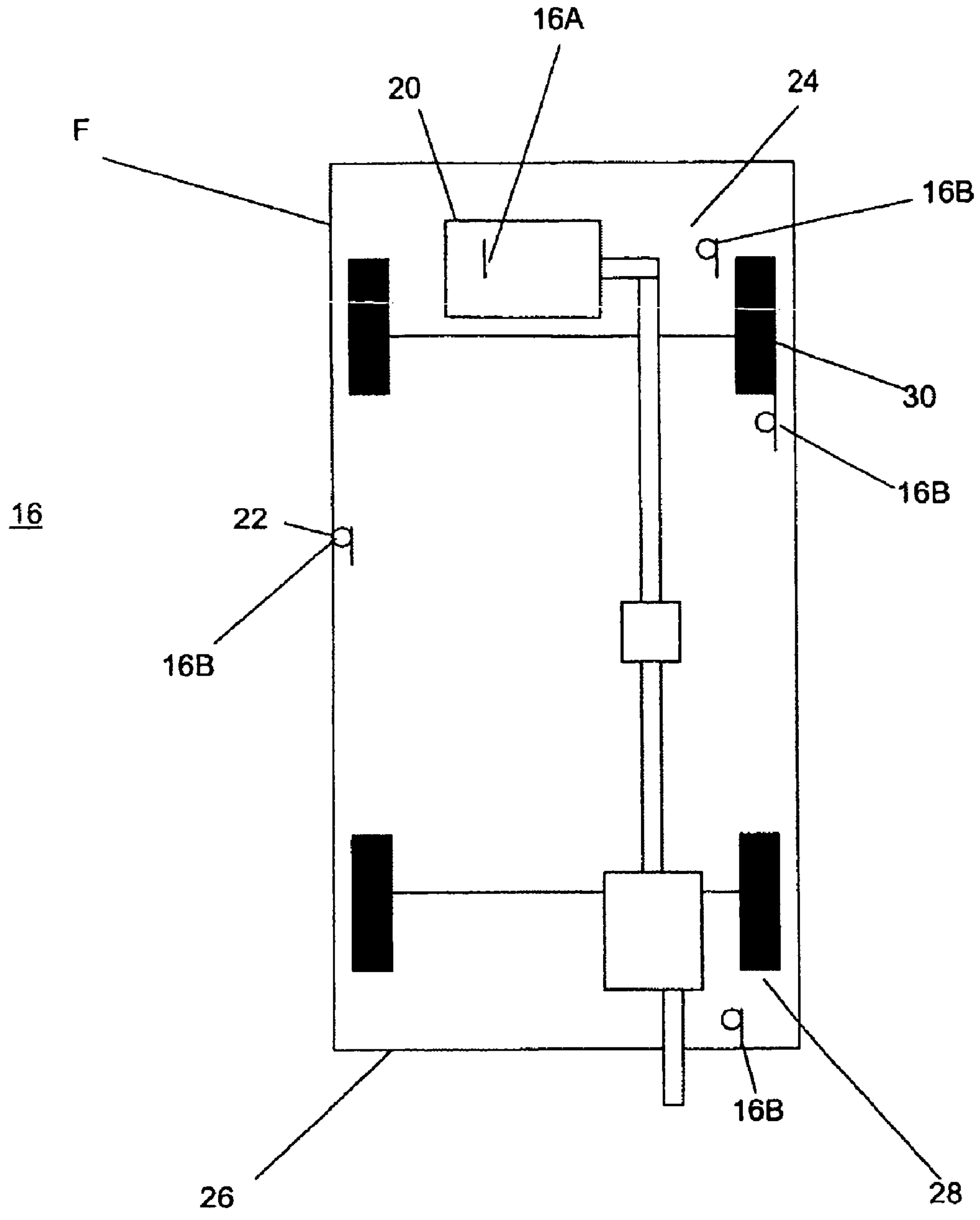
FIG. 2 is a schematic view of a pickup unit with a noise sensing system.

FIG. 2 shows a vehicle F with the pickup unit 6A which comprises the noise sensing system 16 for sensing the overall noise level G(G)=G(F,U)=G(F)+G(U). The noise sensing system 16 comprises a plurality of sound sensors, in particular solid-borne sound sensors 16A and/or airborne sound sensors 16B. FIG. 2 illustrates, by way of example, various installation locations in the vicinity of the sound sources 4A to 4Z for solid-borne sound sensors 16A, for example in the vicinity of a crank casing 20, and for airborne sound sensors 16B, for example in the vicinity of door handles 22, in the engine compartment 24, outside the bodywork 26 in the vicinity of the exhaust gas outlet 28, outside the bodywork 26, for example in the wheel case of at least one driven wheel, in the vicinity of tires 30. In particular the airborne sensor 16B outside the bodywork 26 may comprise a wind protection.

Figure 3:
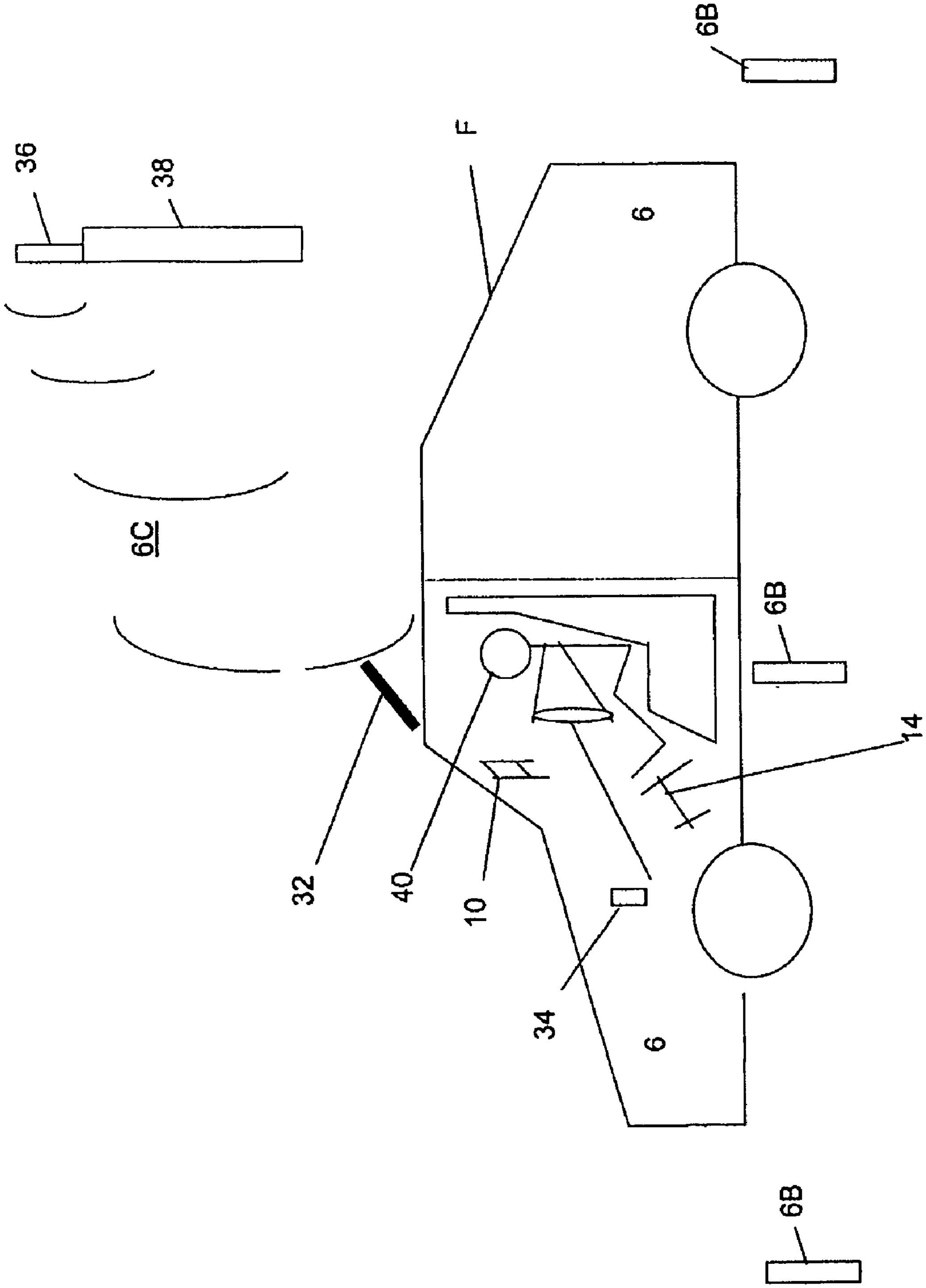
FIG. 3 is a schematic view of a vehicle with a pickup unit according to FIG. 1 and an information system.

FIG. 3 illustrates the vehicle F with the various alternative or additional pickup units 6B and 6C for sensing the external, ambient noise level G(U) and for sensing the instantaneous position P(F) of the vehicle. The pickup unit 6B comprises here a plurality of acoustic measuring devices, for example precision noise level measuring device which are arranged in a fixed position in the proximity of the road pavement or along the road pavement. Furthermore, for example, microphone systems, in particular sensitive microphones with an appropriate directional characteristic are used as pickup unit 6B to sense external noises which cannot be influenced, and thus to determine the ambient noise level G(U).

The pickup unit 6C comprises, for example, a reception antenna 32 with information system 34 inside the vehicle and a transmission antenna 36 of an external information system 38 as an external location determining system. Depending on the type and design of the pickup unit 6C, a navigation system or some other internal and/or external information system which senses the position P(F) can also be used. While the arrangement 1 is operating, data D can be taken into account by the control unit 2 in the regulating and/or control of the load, by means of the pickup unit 6C using an ambient noise level G(U) resulting from the instantaneous position P(F) of the vehicle F, in particular using a maximum permissible noise level Gmax at this vehicle position P(F).

Furthermore, the input device or pickup device 14 for the manual control of the load of the vehicle F by a user, in particular by the driver 40, is illustrated. The input device 14 is embodied here by way of example as a gas pedal. By the driver 40 correspondingly pressing on the gas pedal, the request to call a certain load L is output to the control unit 2. Depending on the type of this process, a noise reducing load L is set by means of the control unit 2 in such a way that the noise limiting value Gmax or guide value or threshold value which is relevant in this situation is not exceeded. Here, depending on the type of control unit 2, the operating variable B, and resulting therefrom, the load L are set as a function of the instantaneous velocity of the vehicle, the instantaneous acceleration of the vehicle, the instantaneous gear velocity, the instantaneous engine speed, the instantaneous engine torque, the vehicle-related noise level G(F) which has been determined, the ambient noise level G(U) which has been determined, the instantaneous position P(F) of the vehicle and/or the desired load L of the driver 40. Further pickup units 6, for example a rotational speed meter (not illustrated in more detail) are provided for determining the vehicle-related operating variables B, for example the velocity, the engine speed.

Three typical cases of load reduction can advantageously be determined:

1. The vehicle first travels at a constant velocity $v_1$ and in doing so generates a noise level of $G_1$ which lies below the maximum permissible noise limiting value Gmax. The driver 40 would like to accelerate with full power to a velocity $v_2$ ($v_2>v_1$) and would thus generate a noise level of $G_{1/2}$ which lies above the noise limiting value Gmax. However, the noise limiting control or regulating process of the control unit 2 selects a reduced load $L_{red}$ which does not permit the noise limiting value Gmax to be exceeded during the acceleration phase from $v_1$ to $v_2$.

2. The vehicle F firstly travels with a constant velocity $v_1$ and in doing so generates a noise level $G_1$ which lies below the maximum permissible noise limiting value Gmax. The driver 40 would like to accelerate to a velocity $v_2$ with a desired load $L_w$. However, the noise level $G_2$ resulting from the velocity $v_2$ would exceed the permissible noise limiting value Gmax ($G_2$>Gmax). The noise limiting control/regulation selects a reduced load $L_{red}$ which accelerates the vehicle F from $v_2$ to $v_{max}<v_2$ given a noise level $G_{1,2}$<Gmax. At $v_{max}$, the vehicle F then generates the maximum permissible noise limiting value Gmax. The noise reducing control/regulating operation of the load $L_{red}$ runs from $v_1$ to $v_{max}$ taking into account increasing traveling noise levels which are the result of relatively high vehicle velocities.

3. The vehicle F firstly travels at a constant velocity $v_1$ and with an appropriate noise level $G_1$ into a residential area. However, the current noise level $G_1$ exceeds the permissible noise limiting value Gmax ($G_1$>Gmax) which applies to the residential area. The noise limiting load control/regulation then goes into the engine brake operating mode or activates the brakes until the velocity $v_{max}$ ($v_{max}<v_1$) which is reduced in comparison with $v_1$ and has the permissible noise limiting value Gmax (Gmax<$G_2$) is reached.

Depending on the type and design of the vehicle F, the output unit 10 is designed to display the instantaneous regulating and/or control state of the control unit 2 in the form of a screen which is arranged in the cockpit. The instantaneous position P(F) of the vehicle, the ambient/vehicle-related noise level G(U), G(F) and/or the operating variable B, in particular its setpoint value and/or actual value, and the instantaneous or desired load L, can be represented for example by means of the output unit 10.

Figure 4:
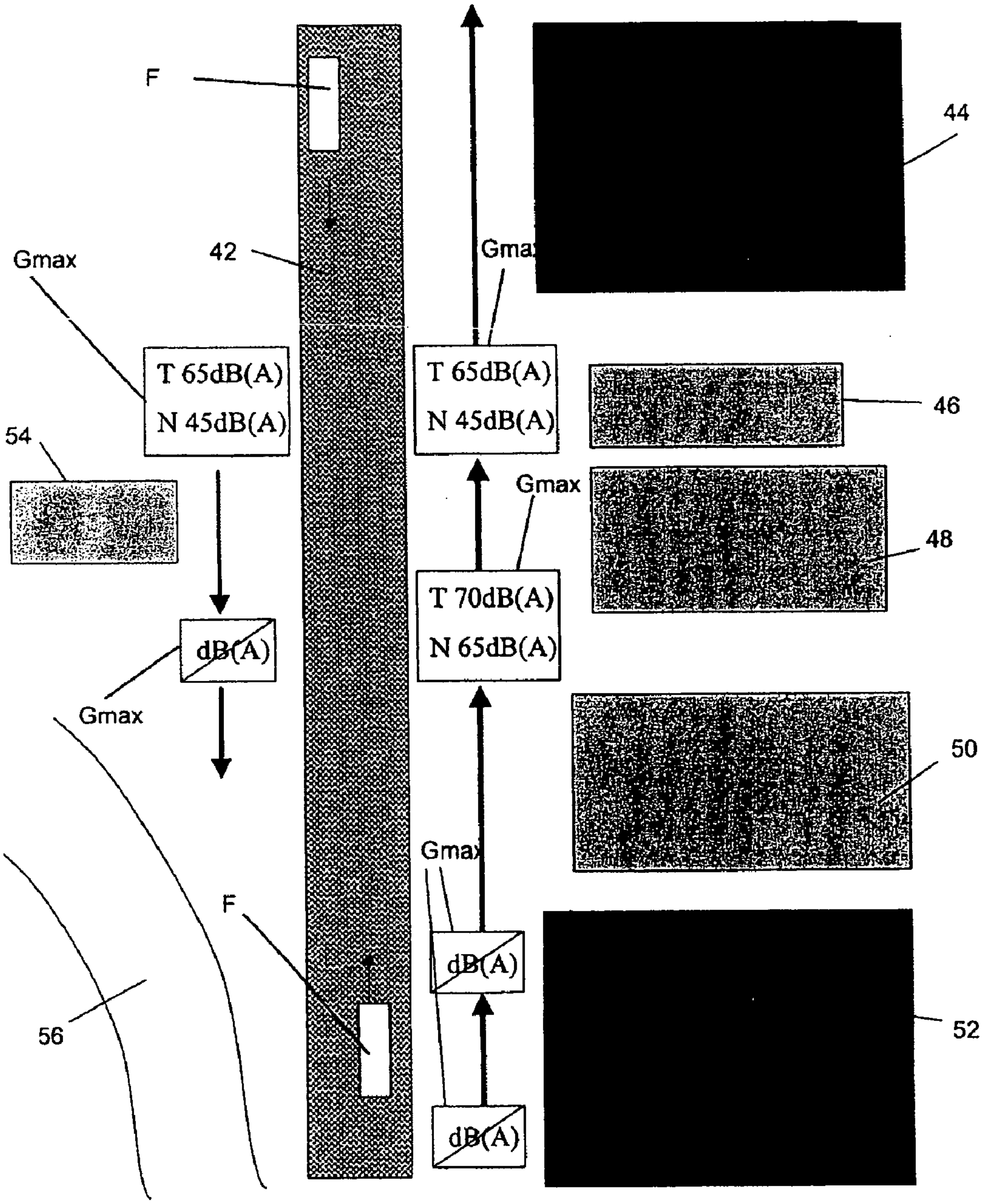
FIG. 4 is a schematic view of the area of application of the arrangement according to FIG. 1.

FIG. 4 illustrates, by way of example, two vehicles F which are each equipped with the arrangement 1, and are traveling along a road 42. Along the road 42 which is to be traveled along, there are various zones with different noise sensitivity, for example a residential area 44, a hospital 46, a park 48, an industrial area 50 (factory with nightshift), an area of forest 52 and a school 54. A load L is set by means of the arrangement 1 (also referred to as noise emission limiter) by reference to the respective control unit 2 of the vehicle F by means of noise-dependent control and/or regulation of the operating variable B which does not exceed a limiting value Gmax, characterizing the respective area 44 to 54, for the entire noise level G(G)=G(U,F)=G(U)+G(F). Here, the noise-dependent control and/or regulation of the operating variable B is carried out as a function of the area 44 to 54 to be traveled through and/or as a function of time. As a rule, a higher limiting value of Gmax=65 dB(A) for the maximum permissible overall noise level G(G) is to be complied with during the day T than at night N with Gmax=45 dB(A) for example in the vicinity of the areas 44, 46 and 54 (residential area, hospital and school). In the vicinity of the areas 48, 50, the associated vehicle 2 is to be set up in relation to the operating variable B and the load L by means of the control unit 2 in such a way that during the day T the limiting value Gmax of 70 dB(A), and at night N a limiting value Gmax of 65 dB(A), are not exceeded as maximum permissible noise levels. In contrast, the noise-related control/regulation of the load L can be switched off in the areas 52 or in the area 56 in the vicinity of a freeway which lie outside the noise-protected areas 44 to 50, 54, as in these areas 52, 56 there are no noise immission limiting values predefined by the federal immission protection law (TA-Lärm [TA noise]).

What is claimed is:

1. A method for at least one of controlling and regulating a load of a vehicle comprising the steps:

determining an instantaneous load of the vehicle by means of at least one operating variable of the vehicle said operating variable being determined by means of a pickup unit;

at least one of controlling and regulating the operating variable by means of one of a control unit and a regulator unit as a function of a noise level resulting from the instantaneous load and as a function of an instantaneous position of the vehicle.

2. The method as claimed in claim 1, characterized in that the operating variable (B) on which the noise level (G(F)) is based is used as the operating variable (B).

3. The method as claimed in claim 1, wherein at least one of a rotational speed, a torque, a velocity and an acceleration are used as the operating variable (B).

4. The method as claimed in claim 1, wherein the noise level is determined by reference to at least one of the instantaneous load of the vehicle and ambient noises.

5. The method as claimed in claim 1, wherein the noise level is monitored for compliance with a limiting value.

6. The method as claimed in claim 1, wherein the operating variable is at least one of controlled and regulated as a function of time.

7. An arrangement for one of controlling and regulating a load of a vehicle, said arrangement comprising:

a pickup unit for determining an instantaneous load of the vehicle by reference to at least one operating variable of the vehicle;

at least one of a control unit and a regulating unit for at least one of controlling and regulating the operating variable as a function of a noise level resulting from the instantaneous load of the vehicle wherein said pickup unit includes a noise sensing system for determining at least one of ambient noise and vehicle-related noise.

8. The arrangement as claimed in claim 7, wherein the pickup unit is provided for sensing at least one of a velocity, an acceleration, a drive rotational speed and a drive torque.

9. The arrangement as claimed in claim 7, further including at least one of a location-determining system for determining the instantaneous position of the vehicle and an information system for determining a resulting, ambient noise level.

10. The arrangement as claimed in claim 7, wherein the control unit or regulator unit has an input device for at least one of manually controlling and regulating the operating variable.

11. The arrangement as claimed in claim 7, wherein, during at least one of the control and regulation of the operating variable, the control unit or regulator unit takes into account predefined values of external systems, in particular of a traffic control system, via the pickup unit.

12. The arrangement as claimed in claim 11, wherein the predefined values of external systems relating to at least one of the control and regulation of the operating variable is approved by at least one of the driver of the vehicle and by an occupant of the vehicle by means of the control unit or regulator unit.

13. The arrangement as claimed in claim 7, further including an output unit for outputting an instantaneous position of the vehicle and the operating variable.

14. The arrangement as claimed in claim 7, wherein the interventions of the control unit or regulator unit into the vehicle system during the one of control and regulation of the operating variable and the vehicle-related operating variables are stored in the data memory for documentation.

15. The arrangement as claimed in claim 14, wherein statistics are created from data stored in a data memory.

16. The arrangement as claimed in claim 14, wherein recommendations for maintenance and repair of the vehicle are derived from a data stored in the data memory.

17. The arrangement as claimed in claim 7, wherein interventions of the control unit or regulator unit into the vehicle system during the control or regulation of the operating variable are transferred to an external system for monitoring.

* * * * *